United States Patent [19]
Closson, Jr.

[11] Patent Number: 5,132,184
[45] Date of Patent: Jul. 21, 1992

[54] LAMINATED COUNTER MATERIAL WITH ORIENTED FILM

[76] Inventor: Addison W. Closson, Jr., 15 Eastern Ave., Essex, Mass. 01929

[21] Appl. No.: 566,611

[22] Filed: Aug. 13, 1990

[51] Int. Cl.⁵ ............................................. B32B 27/08
[52] U.S. Cl. .................................. 428/520; 428/518; 428/519; 428/910
[58] Field of Search ............... 428/516, 520, 522, 521, 428/519, 518, 910

[56] References Cited

U.S. PATENT DOCUMENTS 4,115,612  9/1978  Closson ................................ 428/451
4,814,037  3/1989  Arnold ................................. 428/516

OTHER PUBLICATIONS

"Modern Plastics Encyclopedia", 1991 McGraw Hill, Film Handling Equipment.

*Primary Examiner*—Edith L. Buffalow
*Attorney, Agent, or Firm*—Samuels, Gauthier & Stevens

[57] ABSTRACT

A thermoplastic counter stiffener for a shoe counter. The counter stiffener has a thermoplastic core sheet and a molecular oriented thermoplastic sheet bound to at least one side of the core sheet to impart stiffness thereto.

5 Claims, 1 Drawing Sheet

LAMINATED COUNTER MATERIAL WITH ORIENTED FILM

BACKGROUND AND BRIEF SUMMARY OF THE INVENTION

In the footwear industry, a counter functions to help hold the shoe on the foot, lend support to the wearer's heel and foot, and give the shoe an attractive shape. In the last twenty years, it has become common practice in the shoe manufacturing process to form the counter area or back part of the shoe with specially designed thermoforming machinery using a thermoplastic counter stiffener. This molding process is known as lasting.

Prior to lasting, these counter stiffeners are either inserted in a pocket between the lining and the upper of the shoe or they incorporate a surface which is also the lining of the shoe, in which case the counter stiffener with the lining surface is stitched into the quarter area of the shoe which holds it in place before molding and/or lasting.

The surface applied to the counter stiffener varies with the particular industry. In the canvas footwear industry typically 52"-220 drills or a coated osnaburg is used. In the conventional manufacturing footwear industry, nylon flock surfaces are used with low quality footwear and nonwoven fabrics, such as needle-punched polyester saturated with nitrile rubber, are used with high quality footwear.

A principal property of a counter is its stiffness. To produce a low cost counter of suitable stiffness, various thermoplastic laminates, with or without a fabric coating, have been suggested.

My invention broadly comprises a counter material and a method of making the counter material which has a thermoplastic, core sheet and at least one molecular orientated thermoplastic sheet bonded to one side thereof to impart stiffness to the core sheet. Another sheet, such as a fabric-like material, can be laminated or bonded to the other side. Depending on the use of the counter, an orientated sheet can be laminated or bonded to both sides of the core sheet.

Broadly my invention comprises a counter having a thermoplastic core sheet and a compatible orientated thermoplastic sheet bonded to one side thereof. The method of the invention comprises laminating to a thermoplastic core sheet an orientated compatible thermoplastic sheet.

BRIEF DESCRIPTION OF THE DRAWING(S)

DESCRIPTION OF THE PREFERRED EMBODIMENT(S)

Figure 1:
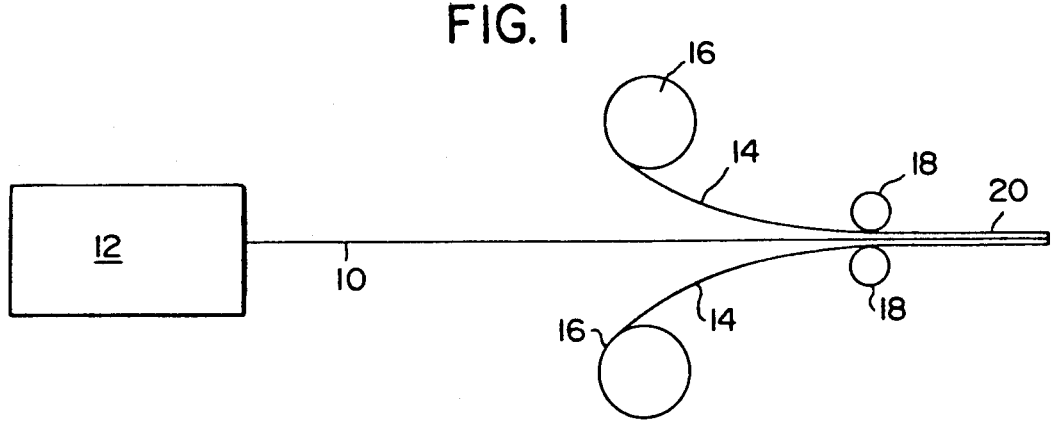
FIG. 1 is a process flow diagram embodying the method of the invention.

The invention will be described in reference to extruding a core sheet of ethylene vinyl acetate, ethylene ethyl acrylate and ethylene-based ionomers, either alone or in combination. The sheet material should have a melt index of between about 0.3 to 10.0, preferably between 0.7 to 1.2. A particularly preferred core sheet is an ionomer, such as available from E. I. Du Pont De Nemours and Co., identified as Surlyn ® 1707, 1706 or 1601 and laminating orientated sheets of polypropylene acid co-polymer to both sides of the core sheet.

Referring to the drawing, a Surlyn ® sheet 10 of a thickness of between 0.2 mm to 2.5 mm is extruded in sheet form from an extruder 12. Pre-oriented polypropylene film 14 of a thickness of between 0.7 mm to 0.05 mm is fed from supply rolls 16 and pass through nip rolls 18 as shown and is bonded to the core sheet 10 to form a laminated counter material 20. A typical nip roll pressure would be between about 2 to 70 psi and the temperature of the extruded Surlyn ®sheet 10 entering the nip rolls would be between about 330° to 460° F.

Figure 2:
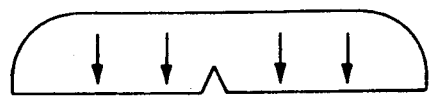
FIG. 2 is a counter embodying the invention.

FIG. 2 illustrates a counter 22 of the invention with the direction of the oriented molecules shown by the arrows.

Although described with reference to Surlyn ® as the core sheet and orientated polypropylene as the outside stiffening layer, or layers, the following compatible combinations are also suitable. Any of several thermoplastic materials having been polymerized to incorporate therein free acid groups, such as acrylic acid or methacrylic acid, may be used in combination with the Surlyn ® core sheet. Additionally, the following illustrative combinations are also within the scope of the invention, acrylonitrile butadiene styrene, styrene butadiene, and/or styrene acrylonitrile, any of which may be used as the core sheet and oriented sheet in any combination; high density polyethylene, polypropylene and its co- and terpolymers ethylene and its co- and terpolymers in any compatible combination and vinyl chloride or vinyl chloride vinyl acetate co-polymers or chlorinated ethylene vinyl acetate. By compatible combination it is meant that the adhesive bond between the core sheet and the laminated oriented sheet will be sufficient such that the counter can function for its intended purpose. The various bonding mechanisms are well known and need not be described in detail. Ionomeric thermoplastics can be easily thermoformed at comparatively low temperatures but will not flow excessively at higher temperatures because of the ionic mechanisms.

Having described my invention, what I now claim is:

1. A counter material which comprises:
    a thermoplastic core sheet having a thickness of between 0.3 to 2.5 mm, the core sheet having a preoriented thermoplastic sheet laminated thereto on at least one side thereof to impart stiffness to the core sheet.

2. The material of claim 1 wherein the core sheet is an ionomer and the oriented film is polyethylene.

3. The material of claim 1 wherein oriented thermoplastic film is laminated to both sides of the core sheet.

4. The material of claim 1 wherein the core sheet is selected from the group consisting of acrylonitrile butadiene styrene, styrene butadiene, styrene acrylonitrile and the oriented film is selected from the group consisting of acrylonitrile butadiene styrene, styrene butadiene, styrene acrylonitrile.

5. The material of claim 1 wherein the core sheet is an ionomeric polymer and the oriented film is selected from the group consisting of high-density polyethylene, polypropylene and its co- and terpolymers ethylene and its co- and terpolymers in any compatible combination and vinyl chloride or vinyl chloride vinyl acetate co-polymers, chlorinated ethylene vinyl acetate with or without free acid groups.

* * * * *